(12) United States Patent
Stringfellow

(10) Patent No.: US 6,359,737 B1
(45) Date of Patent: Mar. 19, 2002

(54) COMBINED HEAD-UP DISPLAY

(75) Inventor: Steven A. Stringfellow, Oakland Township, MI (US)

(73) Assignee: Generals Motors Corporation, Detroit, MI (US)

( * ) Notice: Subject to any disclaimer, the term of this patent is extended or adjusted under 35 U.S.C. 154(b) by 0 days.

(21) Appl. No.: 09/627,484

(22) Filed: Jul. 28, 2000

(51) Int. Cl.[7] .......................... G02B 27/14; H10J 40/14; G09G 5/00; G09G 1/06
(52) U.S. Cl. ........................ 359/631; 359/630; 359/632; 250/214 VT; 345/7; 345/9
(58) Field of Search ................................. 359/629, 630, 359/631, 632, 633; 250/214 VT, 207; 345/7, 9; 349/11

(56) References Cited

U.S. PATENT DOCUMENTS

| | | | | |
|---|---|---|---|---|
| 4,973,139 A | * | 11/1990 | Weinrauch et al. | 349/11 |
| 5,013,134 A | * | 5/1991 | Smith | 359/630 |
| 5,028,119 A | * | 7/1991 | Hegg et al. | 359/632 |
| 5,198,936 A | * | 3/1993 | Stringfellow | 359/831 |
| 5,305,124 A | * | 4/1994 | Chern et al. | 359/13 |
| 5,361,165 A | * | 11/1994 | Stringfellow et al. | 359/631 |
| 5,414,439 A | * | 5/1995 | Groves et al. | 345/7 |
| 5,486,840 A | * | 1/1996 | Borrego et al. | 345/7 |
| 5,619,036 A | * | 4/1997 | Salvio et al. | 250/330 |
| 5,729,016 A | * | 3/1998 | Klapper et al. | 250/334 |
| 5,731,903 A | * | 3/1998 | Cook | 359/633 |

* cited by examiner

Primary Examiner—Georgia Epps
Assistant Examiner—David N. Spector
(74) Attorney, Agent, or Firm—Anthony Luke Simon

(57) ABSTRACT

A head-up display for a vehicle, the display is capable of projecting an imaging illumination from an image source and a night vision display from a night vision source. The display utilizes a beam-splitter which receives the projected image illumination and night vision display and the beam-splitter directs a combined output to a mirror and a combiner for producing a virtual image in front of the eyes of a vehicle operator.

13 Claims, 3 Drawing Sheets

COMBINED HEAD-UP DISPLAY

This application is related to U.S. Pat. Nos. 4,973,139, 5,028,119, 5,198,936 and 5,305,124 the contents of which are incorporated herein in their entirety by reference thereto.

TECHNICAL FIELD

The present invention is related to a head-up display for use in a vehicle. In particular, the head-up display provides the vehicle operator with both a data and night vision display.

BACKGROUND

Vehicle instrumentation information is conventionally displayed on an instrument panel of the vehicle that is below the windshield, which requires that the driver divert his or her eyes from viewing the outside scene to viewing the panel instrumentation, for example, when checking vehicle speed or the status of warning lights. Such diversion requires shifting of the field of view as well as refocusing, and can be a cause of inattention to the changing outside scene.

In recognition of the desirability of providing instrumentation readouts that are within the line of sight of a pilot scanning the outside scene, head-up displays have been utilized in military aircraft to provide instrumentation and other readouts. However, such head-up display systems are complex and expensive, and have capabilities not required in an automobile or similar vehicle.

It would therefore be an advantage to provide a head-up display for vehicles which produces a virtual image that is viewable by the vehicle operator without diversion of vision from the outside scene.

Another advantage would be to provide a head-up display for vehicles which produces virtual images at or ahead of the windshield and provides for normal visibility through the windshield.

SUMMARY OF THE INVENTION

The disclosed invention is directed generally to a head-up virtual image display for a vehicle for displaying instrumentation information, and is more particularly directed to a vehicle head-up dynamic instrument display which provides for a virtual image instrument display and a night vision display at or ahead of the windshield of a vehicle.

The foregoing and other advantages are provided by the invention in a head-up display system that includes an image source for producing imaging illumination for both display devices (instrument display and night vision display), optical apparatus for directing the illumination provided by said source to the windshield, and a combiner including a portion of the windshield for partially reflecting the directed imaging illumination to produce a virtual image of the image source viewable by the operator of the vehicle.

In addition, the illumination of the graphic display and the night vision display are controlled exclusive of each other.

BRIEF DESCRIPTION OF THE DRAWINGS

Other objects, features, advantages and details of the present invention appear, by way of example only, in the following detailed description of preferred embodiments of the invention, the detailed description referring to the drawings in which.

DESCRIPTION OF THE PREFERRED EMBODIMENTS

Figure 1:
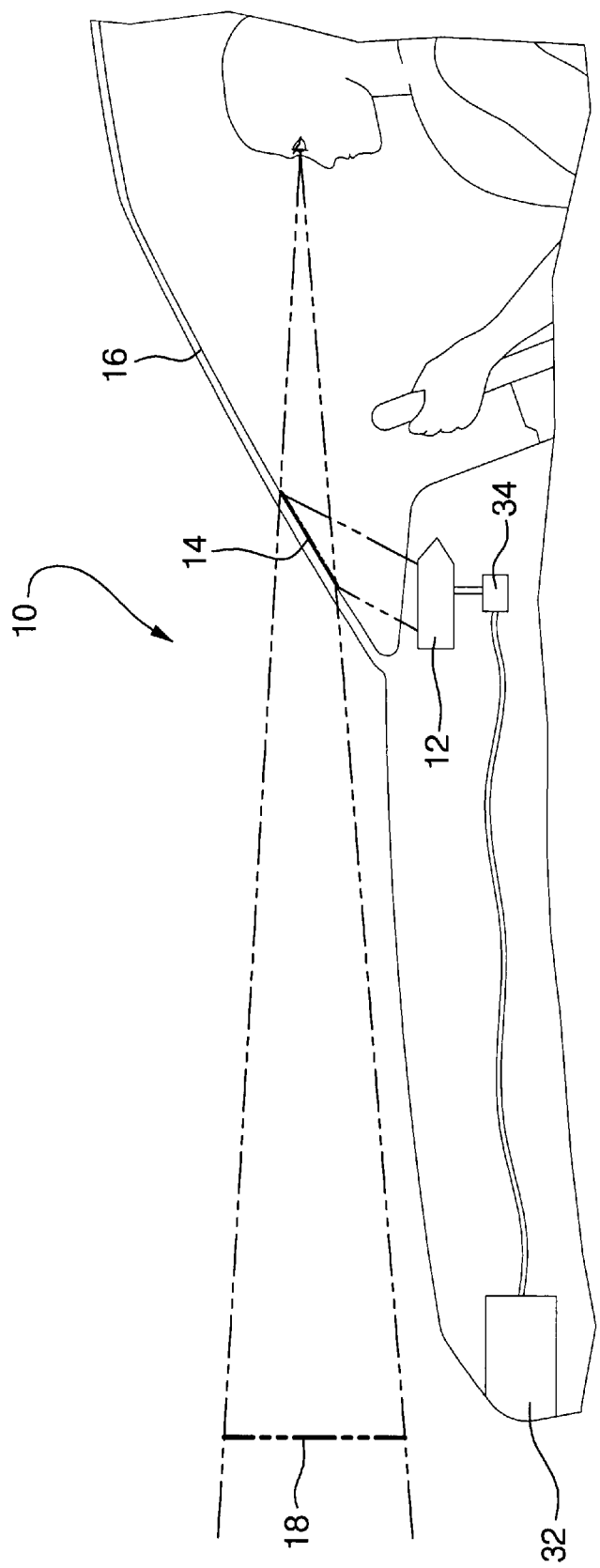
FIG. 1 is a schematic illustration of a vehicle head-up display system.

Referring now to FIG. 1, a head-up vehicle instrument display system 10 is illustrated. Display system 10 includes an imaging illumination source 12 and a combiner element 14 that comprises a portion of a vehicle windshield 16 such as an automobile windshield for example. Imaging illumination source 12 is positioned for passage of the imaging illumination. For example, imaging illumination source 12 can be positioned on the dashboard or within the dashboard with an appropriate opening for passage of the imaging illumination. The combiner element 14 partially reflects the imaging illumination toward the driver so as to produce a virtual image 18 of a light-emitting image source within the imaging illumination source at a location ahead of the vehicle windshield, for example.

Image illuminating source 12 provides a dual image projection in the form of a HUD night vision display and a HUD display of vehicle information, the vehicle information display being visible during both daytime and nighttime conditions.

While the disclosed embodiments are described in the context of a vehicle such as an automobile, it should be appreciated that the term vehicle encompasses other vehicles that include a windshield or similar transparent protective device. The term vehicle also encompasses vehicles that do not have windshields, in which case the combiner would comprise a transparent panel, for example.

By way of illustrative example, the combiner element 14 comprises a portion of the inside surface of the windshield, which pursuant to the Snell's reflection laws, partially reflects the imaging illumination provided by imaging illumination source 12. By way of specific example, the imaging illumination is incident on the windshield inside surface at about 65 degrees relative to normal, which provides for reflection of about 10 to 15 percent of the incident illumination. Of course, and as applications may require, the angle of incidence and/or reflection of incident illumination may vary.

As an alternative, combiner element 14 can also comprise a metallic coating that does not reduce light transmission below the pertinent federal standard, presently 70%, or a multilayer dielectric reflecting coating. Such coatings would be applied to either the inside surface of the windshield or between the layers of the windshield. While application of the coating to the inside surface would provide for a better image, the coating would be more susceptible to physical damage. While a coating between the layers of the windshield would be protected from physical damage, reflection off the inside surface would produce a ghost image, which could be reduced in intensity by an anti-reflection coating on the inside surface, but that would be susceptible to physical damage.

Referring now to automotive applications, the apparatus and method of the present invention utilizes the vehicle windshield as a combiner. Moreover, and in order to eliminate ghost images, the required windshield wedge angle is in the range of 0.17–0.14 milli-radians, which is also the angle of a standard windshield. Thus, the present invention requires no modification of the windshield wedge angle.

One method of providing ghost-free head-up display employing a wedged windshield is disclosed in U.S. Pat. No. 5,013,134, the entire contents of which are incorporated herein by reference thereto.

As a further alternative, the reflection element 14 can be a reflection hologram.

Figure 2:
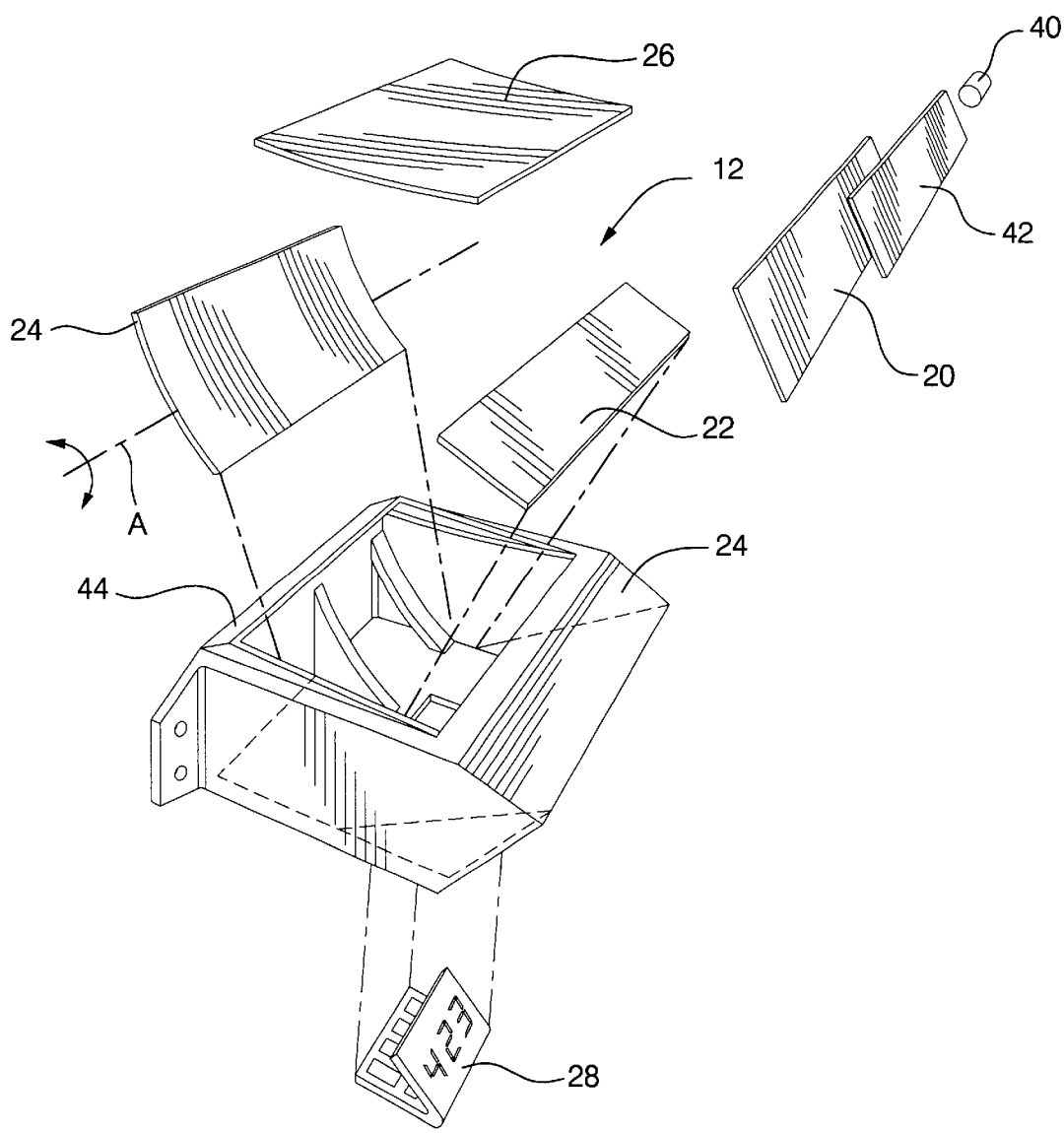
FIG. 2 is a schematic exploded view of the imaging illumination source of the head-up display system of FIG. 1.
Figure 3:
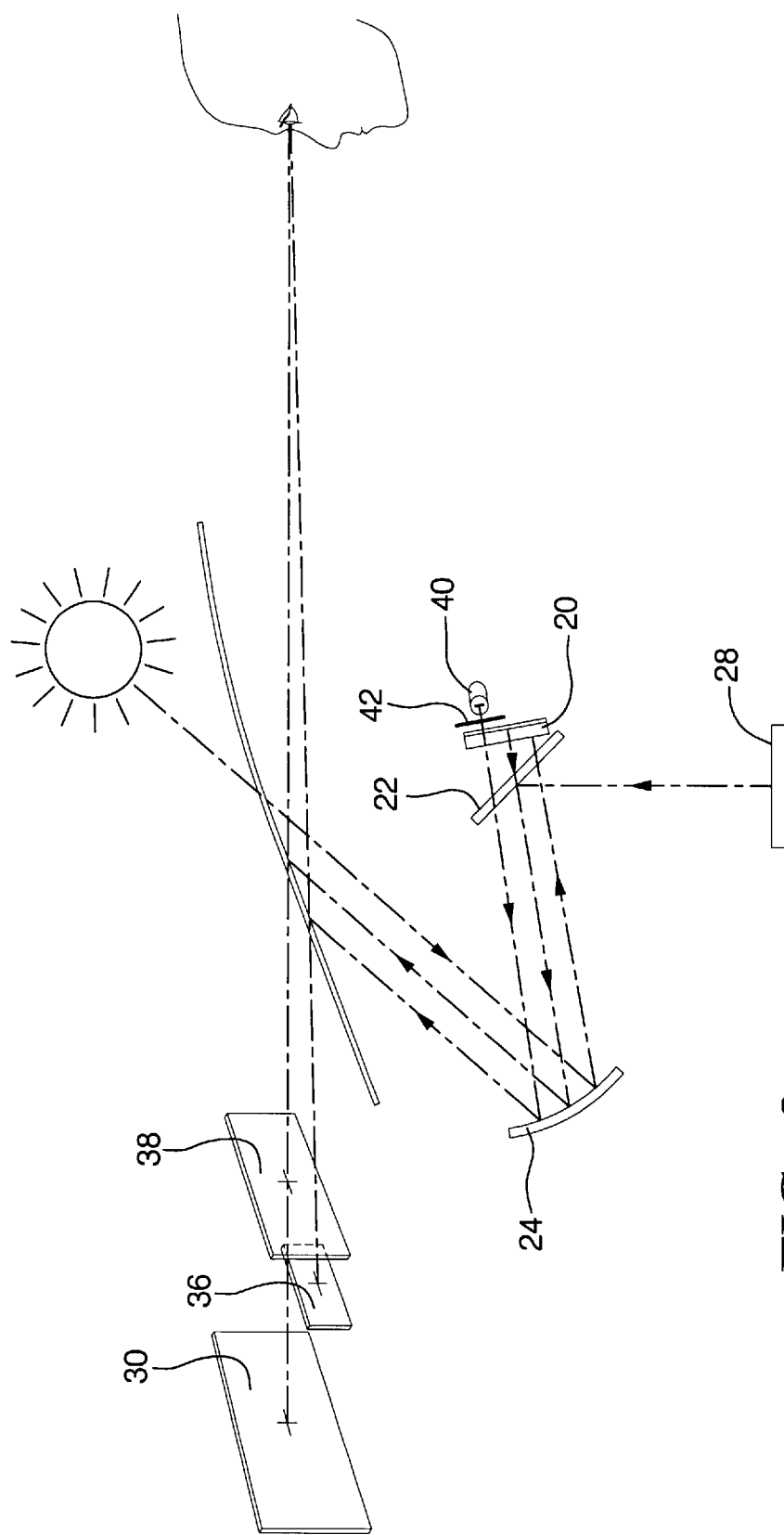
FIG. 3 is a schematic illustration of the vehicle head-up display of the present invention.

Referring now to FIGS. 1–3, a detailed view of the imaging illumination source 12 which includes an image source 20 comprising, for example, a high intensity vacuum fluorescent display (VFD) such as those commercially available from Futaba Corporation of America, Plymouth, Mich. A VFD commonly includes segmented elements that are selectively energizable to form light-emitting numerical and/or alphabetical symbols, or other indicia. Inputs to the image source 20 are provided by appropriate transducing circuitry to display selected vehicle and/or engine operating parameters and conditions.

The video display is not limited to a vacuum fluorescent display. For example, and as an alternative, an active matrix liquid crystal display (LCD) can be used to display the symbols or other indicia. Active matrix LCDs are available from such companies as Citizen, Sharp and Toshiba.

The present invention utilizes the novel configuration of incorporating daytime visible displays (image source 20) within an infrared night vision head-up display. This instrument allows the driver to view the same types of vehicle data (speed, warnings, graphics, telltales, navigation information, etc.) as currently available in reconfigurable automotive head-up displays, along with an infrared night vision image of the road ahead. The night vision system can be turned off, allowing the driver to view only the data or vice versa (the data may be turned off leaving the night vision on). During the day, the high brightness data display is available.

The establishment of this configuration is accomplished by combining both the day and night head-up display technologies within the same unit.

Two separate types of optical systems generally cannot reside within the same packaging space (which is limited in the automotive environment), so beam-splitter technology is integrated. Through the use of beam-splitter technology, one system or the other (night vision or imaging source 20) or both can be illuminated utilizing the same aspherical mirror, apertures and enclosure. The beam-splitter (a partially reflective, front surface coated mirror) allows one display to show through it, while the other display is reflected off the front of the mirror. While the night vision system display only requires a brightness of approximately 8 foot-Lamberts, the day vision display requires a minimum of 1000 foot-Lamberts. An 80–90% reflective beam-splitter can allow a high brightness data visible display to reflect off the face of the beam-splitter and provide necessary brightness while also allowing a somewhat dimmer night vision display (shining through the splitter) to still provide its eight foot-Lamberts brightness requirement.

A beam-splitter 22 is secured within a housing 24 of image illuminating source 12. Beam-splitter 22 relays the imaging illumination from the image source 20 to an off-axis mirror 24, which in turn relays the imaging illumination through a transparent cover 26 to the combiner element 14. As discussed more fully herein, mirror 24 can be fixedly secured in the housing or can be tiltable about a lateral axis "A."

Beam-splitter 22 can be planar or can have some optical power such as a cylindrical surface to compensate for windshield shape or the power of the mirror 24. In an exemplary embodiment, beam-splitter 22 is planar and is arranged to be at an angular configuration of approximately 57.374 degrees with respect to night vision display source 28. Of course, and as applications may require, the angular configuration of beam-splitter 22 may vary.

It should be appreciated that with an odd number of reflecting elements (e.g., three), the image source 20 must be adapted to be a mirror image of the intended virtual image. With an even number of reflecting elements (e.g., two), the image source 20 would be adapted to be oriented the same as the intended virtual image.

Mirror 24 is generally concave and magnifies the image relayed to the combiner element 14, and is preferably an aspheric element. The particular curvatures of the mirror 24 can be defined so as to compensate for the distortion introduced by the off-axis configuration of the mirror 24 and the distortion introduced by the curvatures of the windshield.

A night vision display source 28 is positioned to provide an image to beam-splitter 22 which results in a primary image plane 30. Night vision display source 28 is coupled to a camera 32 (FIG. 1) and a projector 34 (not shown) for providing the image of camera 32 to night vision display source 28. In one contemplated embodiment, night vision display source 28 may include projector 34. It is also noted that camera 32 may be positioned in any position that would result in the camera being able to view the path in front of the vehicle.

Image source 20 also projects an image, in the form of the vehicle systems display, towards beam-splitter 22. This results in a second image plane 36. A third image plane 38 is generated by an LED light source 40 which is projected through a graphic filter 42, image source 20, and beam-splitter 22. LED light source 40 provides graphic telltales and colors other than may be available by other display devices. Graphic filter 42 provides shapes and outlines to the LED light source. In addition, LED light source 40 could be full-color.

As an alternative, the positioning of night vision display source 28 and image source 20 are interchangeable. Of course, and if the position of night vision display source 28 is exchanged with image source 20, beam splitter element 22 must be modified.

An additional advantage of this configuration is longer optical-length and resulting reduced system magnification. The magnifying of sunlight off curved mirror 24 creates tremendous heat. The coating on the beamsplitter is specified to be I/R (heat) absorbing and is located in the optical path at a point when the sun is defocused. This eliminates the need for heat related mechanical countermeasures and reduces system cost.

The unique configuration of this technology now allows the driver the "best of both worlds". Currently, a night vision head-up display system only provides a nighttime display, leaving its large aperture in the top of the dash but having no use during the day. Likewise, if the driver wants daytime head-up information, night vision would not be available. This invention will allow both. The display of the present invention is expected to provide increased vehicle operator awareness by providing adaptive cruise control displays, night vision, navigation and other information, at a reasonable cost. The display can be configured to be shown on two or more visual planes, providing the exciting visual effect of a multi-dimensional head-up display with images onto one or more visual planes. In addition, two types of displays (daytime and nighttime) can be separately dimmed.

The display of the present invention also provides the following advantages:

Consumes less power due to the use of low-power LED lighting.

Provides a display technology that is affordable by the consumer.

Focuses both sets of imagery out to bumper distance for easy eye accommodation.

Both sets of imagery can be focused at different planes.

Allows independent dimming of data and night vision imagery.

Packages both day and night HUD technology in one enclosure.

As an alternative, enclosure 24 is configured to have an opening leading to the vehicle HVAC system which allows for defrost air from the HVAC system to blow through the HUD top aperture.

The optical elements are configured so that the operator can view the entire displayed virtual image over a region in space called an eyebox. A relatively large eyebox is desired to allow normal head motion of the driver, and also to encompass the variation in head location of the driver population (i.e., tall or short drivers). To achieve a relatively large eyebox, a large mirror 24 can be utilized, which in turn would result in a larger package for the imaging illumination source 12. Alternatively, a smaller mirror 24 which is selectively tiltable about the lateral axis "A" can provide a vertically adjustable eyebox location while keeping the imaging illumination source package small. For each different driver, the small tiltable mirror 24 would be adjusted to a fixed tilt so that the center of the eyebox is appropriate for the driver's head location, and at such fixed tilt would provide a sufficiently large eyebox to permit normal driver head motion. By way of specific example, the mirror 24 could be controllably tilted by an apparatus similar to that utilized for remotely controlled automobile side view mirrors.

Although the combiner in the foregoing illustrative examples comprises a windshield or a coating applied thereto, it should be appreciated that for vehicles that do not include a windshield, the combiner can comprise a transparent panel or a coating applied thereto.

While the image source 20 is specifically disclosed as a vacuum fluorescent display, other spectrally broad sources can be utilized as the image source 20, including segmented and matrix addressable liquid crystal displays (LCDs) which, for example, can be obtained from Seiko of Japan. By way of specific example, an appropriate LCD would present negative graphics if directly viewed, wherein most of the display would be dark and only the segments or pixels comprising the desired display indicia would be "on" or transparent. The LCD would include a backlighting scheme whereby light would be transmitted substantially only by the segments or pixels that are on or transparent.

More particularly as to an LCD, it could include an incandescent bulb. However, LEDs are preferred due to their higher brightness, and collimating elements for providing collimated illumination. Preferably, the illumination elements would be designed so that in combination with the aspheric mirror 24, the image of the bulb filament would nominally re-image at the center of the eye box (which is the region in space where the viewers eyes are located to view the virtual image). Depending on the desired eye box size, the LCD could include a diffuser, a thin ground glass layer for example, on the illumination side of the LCD for providing a slight amount of diffusion.

Since liquid crystal displays emit polarized light, the polarization of the illumination output of liquid crystal displays could be controlled to enhance reflection off the combiner element 14. For example, a horizontal polarizing element can be employed.

For the illustrative example of the combiner element 14, comprising the inside surface of the windshield and an incident angle of about 65 degrees, the reflection efficiency for S-polarized light is much greater than for P-polarized light. Thus, the LCD utilized as the image source 20 could be configured to emit S-polarized light for maximum light efficiency. However, it should be noted that polarized sunglasses are commonly P-polarized, and would cause the head-up display image to dim considerably.

The disclosed imaging illumination source 12 is advantageously an enclosed structure which prevents potentially contaminating and damaging dirt, dust and physical objects from entering the source. However, it should be noted that dazzling or veiling reflections from the transparent cover 26 to the driver should be avoided. By way of specific example as to installation of the head-up display system in an automobile having an angled windshield, the top surface of the transparent cover 26 can be a concave portion of an elliptically shaped cylinder having its longitudinal axis extending laterally and defined by two foci respectively, located (a) behind and below the top edge of a light trap 44 located along the top front edge of the imaging illumination source 12 and nominally parallel to the windshield, and (b) above the windshield and behind the focus at the light trap, such that when this focus is optically folded by the vehicle windshield it will lie below the eyebox. In other words, the elliptical cylinder that would include the top surface of the transparent cover 26 would be defined by the foregoing foci.

With the elliptical cylindrical top surface, the pertinent sunlight and skylight reflections are focused in directions away and down from the operator's eyes. In particular, light incident on the transparent cover from above the focus at the light trap (i.e., skylight and sunlight) and reflected by the transparent cover will be reflected by the windshield to a location below the eyebox. Light incident on the transparent cover from below the focus at the light trap (i.e., from the inside surface of the light trap) and reflected by the transparent cover will be reflected by the windshield into and above the eyebox. Thus, the operator sees only the inside surface of the light trap, which is preferably matte black, so that the viewed image thereof is a dark area.

The foregoing has been a disclosure of a head-up vehicle instrument display system that provides a virtual image that is viewable by the driver without significant diversion from viewing the outside scene. The head-up display system is easily manufactured and incorporated in vehicles such as automobiles, and can be implemented without special processing of the vehicle windshields.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A head-up display for a vehicle having a windshield, comprising:

a) an image source for providing an imaging illumination;

b) a night vision display source providing a night vision display;

c) a beam-splitter receiving said imaging illumination and said night vision display, said beam-splitter receiving and directing said imaging illumination and said night vision display;

d) a combiner including a portion of said windshield; and e) an off-axis aspheric mirror for reflecting said imaging illumination and said night vision display.

2. The display as in claim 1, wherein said mirror compensates for distortions due to the off-axis configuration and the curvature of said windshield portion of the combiner, wherein said aspheric mirror is tiltably adjustable to accommodate the vertical location of the vehicle operator's head.

3. The display as in claim 1, wherein said image source comprises a vacuum fluorescent display.

4. The display as in claim 1, wherein said image source comprises a liquid crystal display.

5. The display as in claim 4 wherein said liquid crystal display provides illumination that is polarized to enhance reflection from the inside surface of the windshield.

6. The display as in claim 1, further including a transparent cover which transmits the imaging illumination directed to the windshield, said transparent cover being shaped to direct sunlight and skylight reflections therefrom away from the eyes of the vehicle operator.

7. The display as in claim 1, wherein the illumination of said night vision display and said image source are independently controlled.

8. A head-up display for a vehicle comprising:

a) an image source for providing imaging illumination;

b) a night vision display source providing a night vision display;

c) a combiner for receiving said imaging illumination and said night vision display to produce in response thereto a virtual image of said image source and said night vision display;

d) an off-axis aspheric mirror for reflecting said imaging illumination and said night vision display to said combiner from said image source and said night vision display source and for compensating distortions due to the off-axis configuration and any curvature in said combiner, wherein said aspheric mirror is tiltably adjustable to accommodate the vertical location of the vehicle operator's head; and e) a beam-splitter receiving said imaging illumination and said night vision display, said beam-splitter directing said imaging illumination and said night vision display to said mirror.

9. The display as in claim 8, wherein said image source comprises a vacuum fluorescent display.

10. The display as in claim 8, wherein said image source comprises a liquid crystal display.

11. The display as in claim 10, wherein said liquid crystal display provides illumination that is polarized to enhance reflection from the inside surface of the windshield.

12. The display as in claim 8, further including a transparent cover that transmits said imaging illumination directed to said windshield, said transparent cover being shaped to direct sunlight and skylight reflections therefrom away from the eyes of the vehicle operator.

13. The display as in claim 8, wherein said combiner further comprises a reflection coating applied to the windshield.

\* \* \* \* \*